US008833176B1

(12) United States Patent
Shapiro et al.

(10) Patent No.: US 8,833,176 B1
(45) Date of Patent: Sep. 16, 2014

(54) DEADEYE FOR MEASURING TENSION IN RIGGING FOR BOATS

(76) Inventors: Daniel Shapiro, Wallingford, CT (US); Neal Wostbrock, Wallingford, CT (US)

(*) Notice: Subject to any disclaimer, the term of this patent is extended or adjusted under 35 U.S.C. 154(b) by 76 days.

(21) Appl. No.: 13/601,702

(22) Filed: Aug. 31, 2012

Related U.S. Application Data

(60) Provisional application No. 61/530,986, filed on Sep. 4, 2011.

(51) Int. Cl.
*G01N 3/08* (2006.01)

(52) U.S. Cl.
USPC .......................................................... 73/828

(58) Field of Classification Search
CPC ..... B63B 2021/008; G01L 5/107; G01L 5/06; G01L 5/04
USPC ...................... 73/760, 828, 862.194, 862.393
See application file for complete search history.

(56) References Cited

U.S. PATENT DOCUMENTS

| 3,970,028 | A | * | 7/1976 | Motai et al. ............... 114/230.21 |
| 4,628,296 | A | * | 12/1986 | Kitagawa et al. .................. 338/3 |
| 5,694,337 | A | * | 12/1997 | Macken ........................... 700/91 |
| 6,543,296 | B1 | * | 4/2003 | Bermudez ........................ 73/828 |
| 6,776,056 | B2 | * | 8/2004 | Garver et al. .................... 73/862 |
| 7,219,396 | B2 | * | 5/2007 | Hsieh ............................. 24/68 R |
| 7,222,545 | B2 | * | 5/2007 | Blakesley et al. ......... 73/862.391 |
| 7,473,060 | B2 | * | 1/2009 | Mohr et al. .................... 409/233 |
| 7,975,554 | B2 | | 7/2011 | Berkcan et al. ................. 73/773 |
| 2003/0024327 | A1 | * | 2/2003 | Garver et al. ............. 73/862.393 |
| 2005/0001418 | A1 | * | 1/2005 | Kanbe et al. ................... 280/806 |
| 2010/0024590 | A1 | * | 2/2010 | O'Neill et al. ............... 74/594.1 |

* cited by examiner

*Primary Examiner* — Max Noori
(74) *Attorney, Agent, or Firm* — Fattibene and Fattibene LLC; Paul A. Fattibene

(57) ABSTRACT

A device detecting tension in synthetic rigging in a sailboat. A deadeye used in rigging has an opening therein containing a strain gauge module. The strain gauge module is positioned between one end of the deadeye and lashing eyelets. Different strain gauge module substrate configurations are used. A transmitter module is coupled to the strain gauge module for wirelessly transmitting signals representative of the rigging load or tension. The strain gauge module is easily removable for repair or replacement.

18 Claims, 8 Drawing Sheets

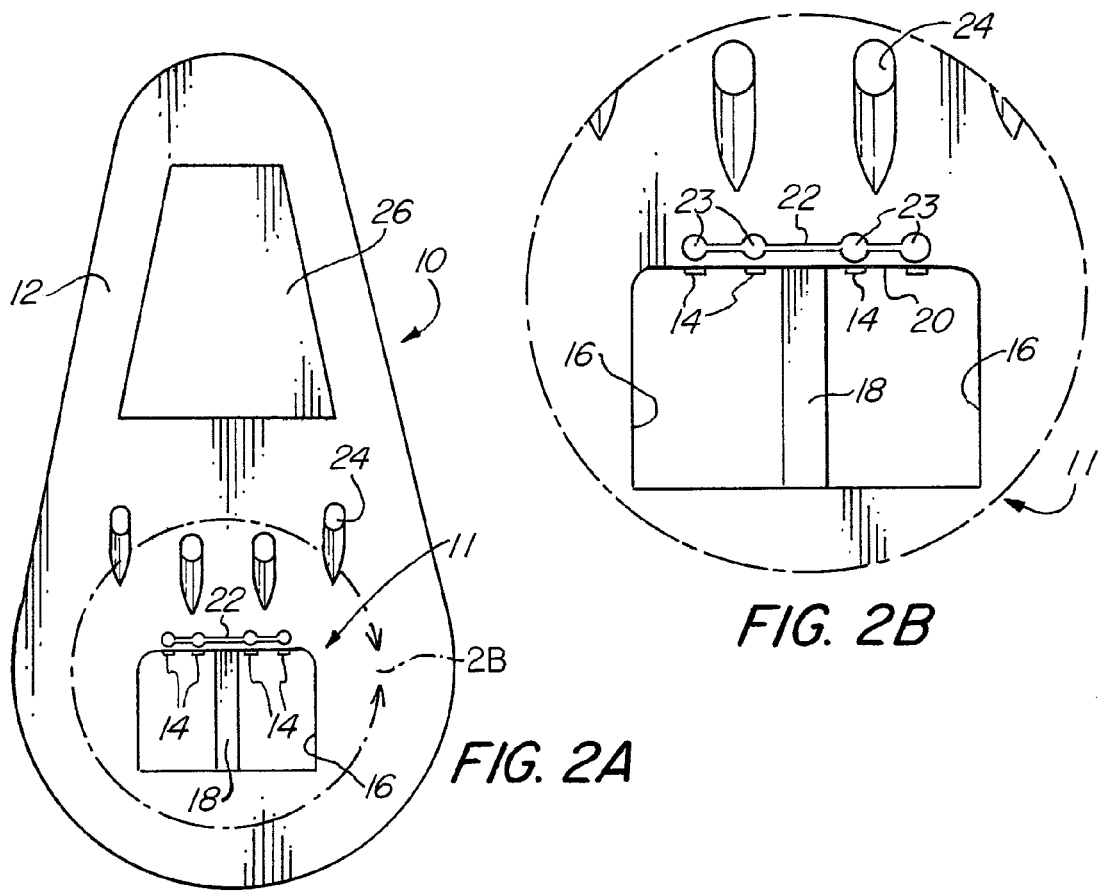
FIG. 2A
FIG. 2B
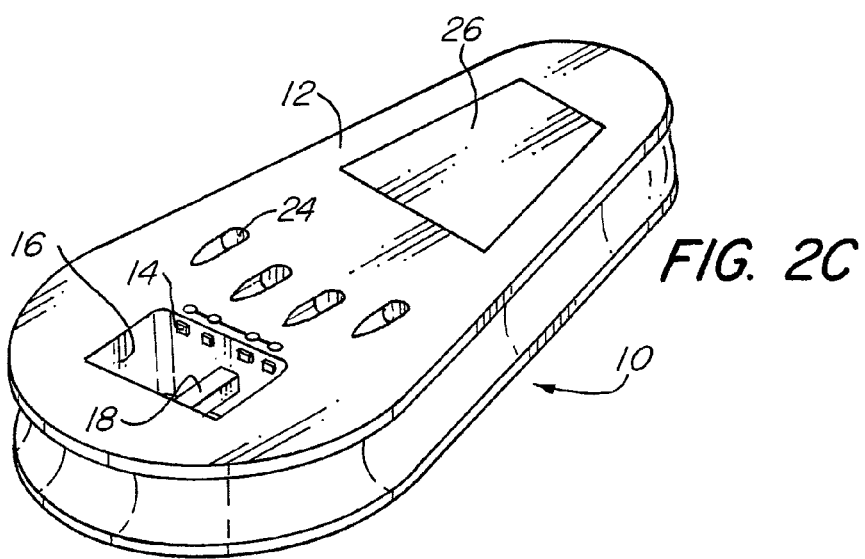
FIG. 2C

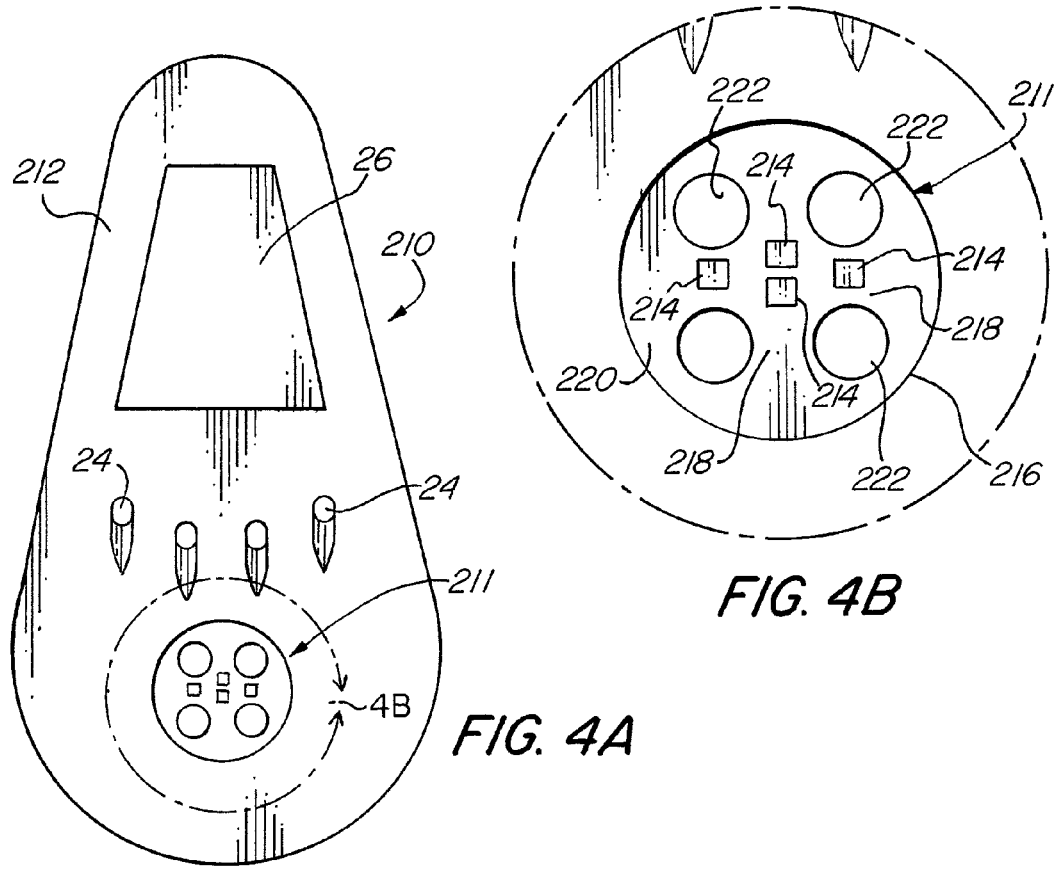
FIG. 4A
FIG. 4B
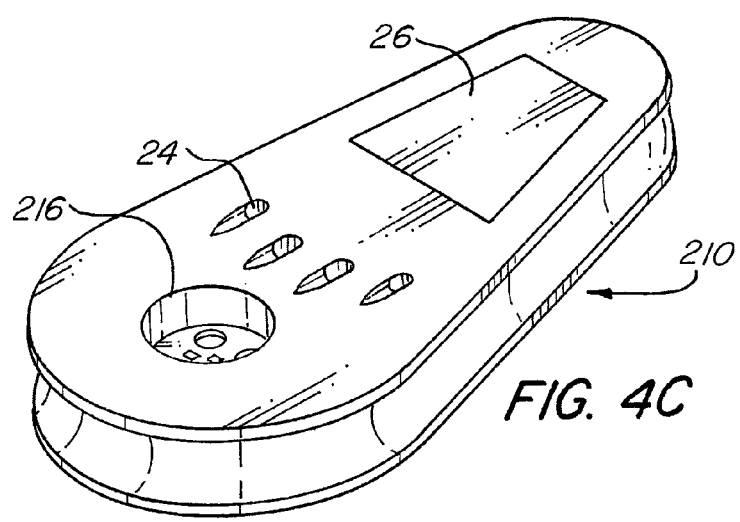
FIG. 4C

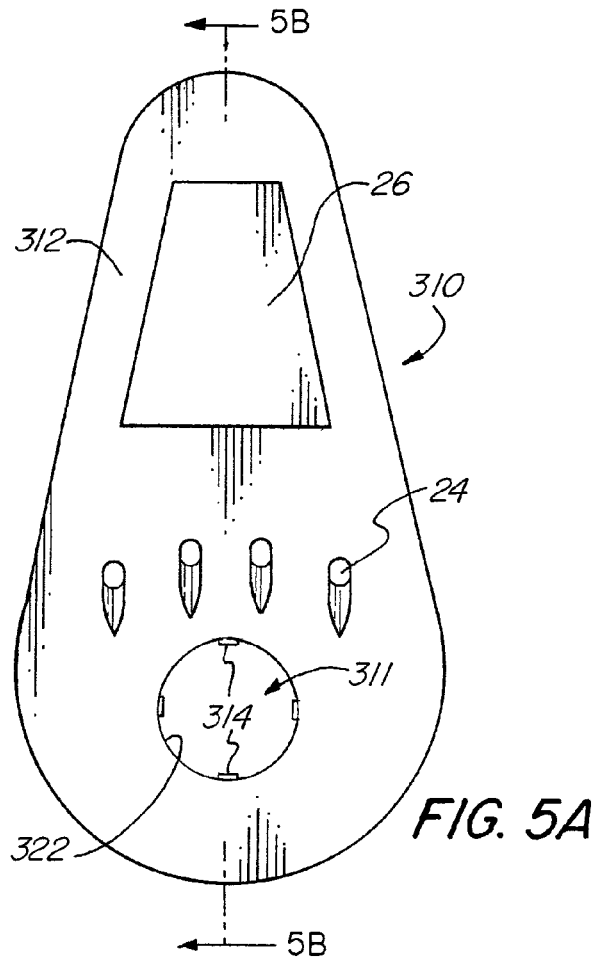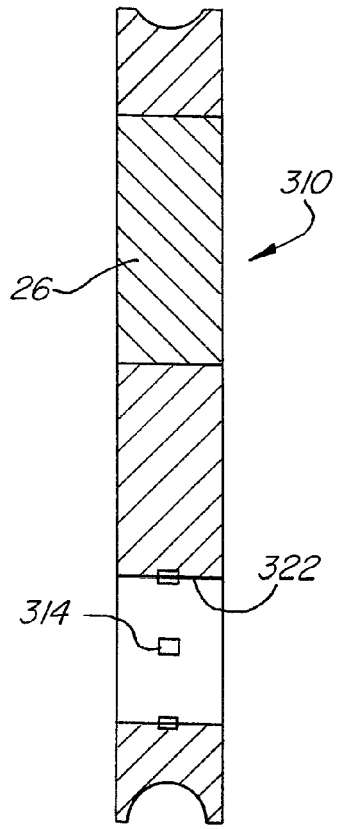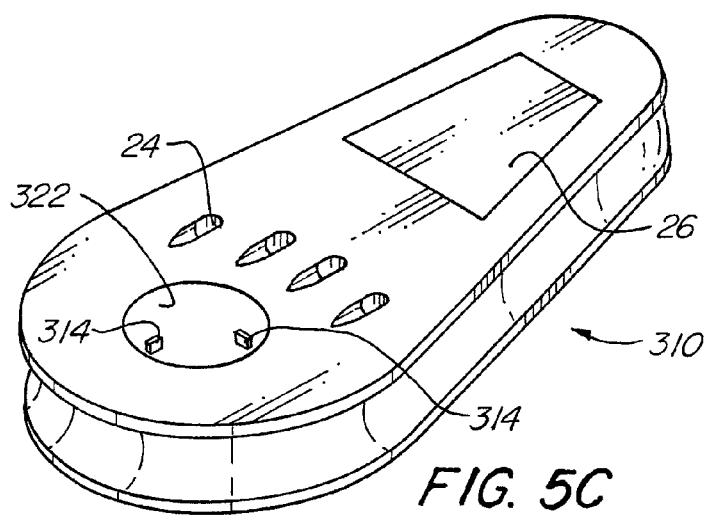

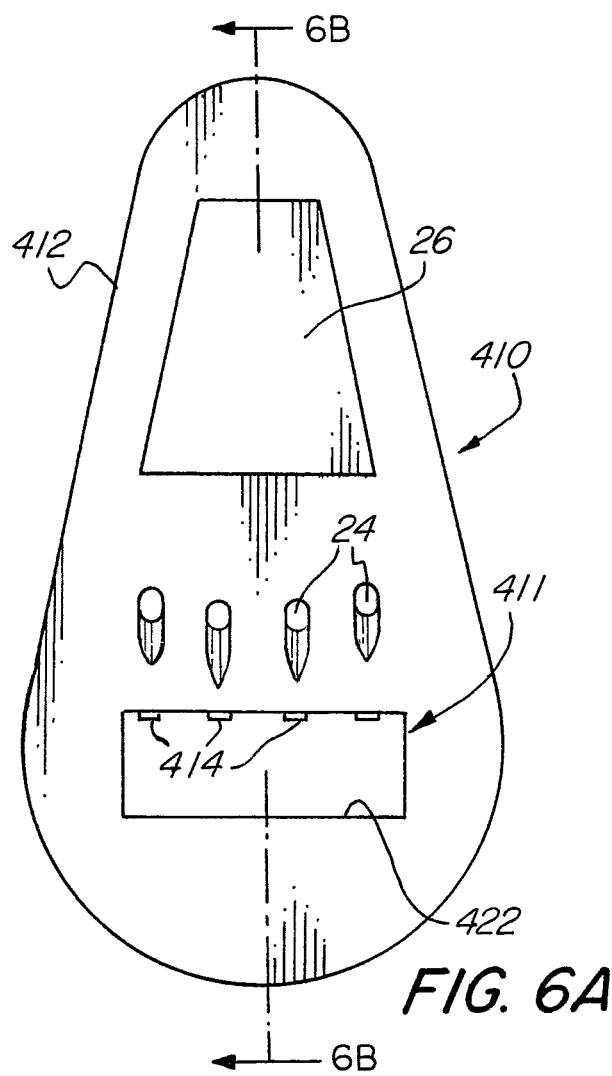
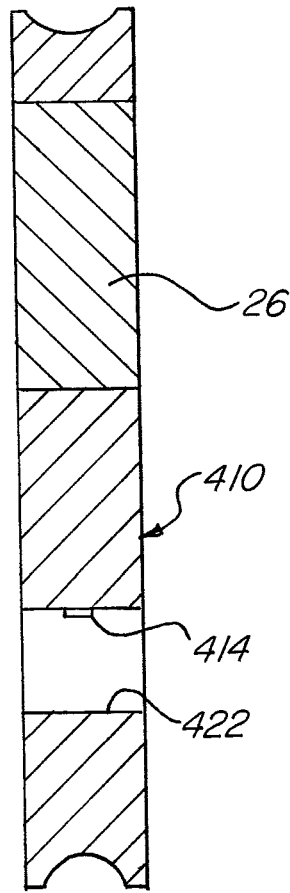
FIG. 6A
FIG. 6B
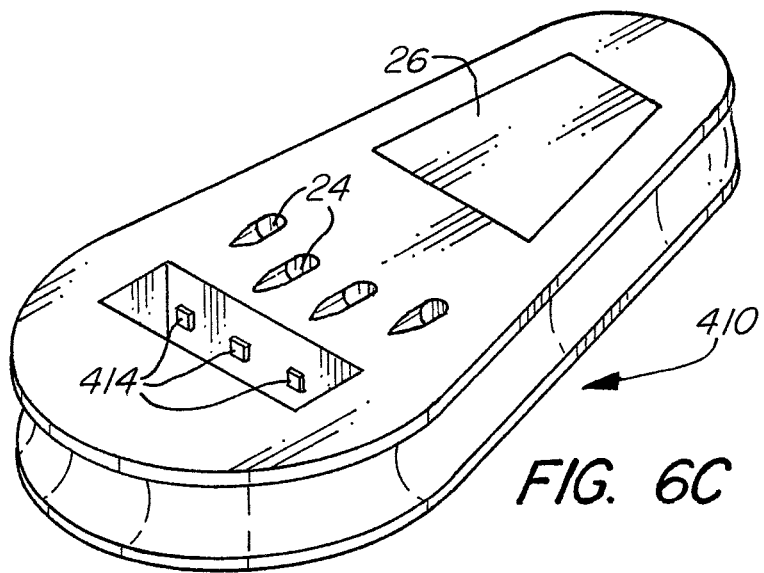
FIG. 6C

US 8,833,176 B1

DEADEYE FOR MEASURING TENSION IN RIGGING FOR BOATS

RELATED APPLICATION

This application claims the benefit of U.S. Provisional Application No. 61/530,986 filed Sep. 4, 2011.

FIELD OF THE INVENTION

The present invention relates in general to sailboat rigging, and more particularly to deadeyes used with low stretch synthetic rigging and detecting the tension in the rigging.

BACKGROUND OF THE INVENTION

In sailboats rigging is used to support the mast and transmit power to the hull. Sailing is most efficient when the rigging is properly tuned to provide optimal tension for transmitting power from the sails to the hull of the sailboat. The standing rigging of a sailboat has both static and dynamic loads.

FIG. 1 illustrates a known rigging system using a pair of deadeyes 1 and 2 with lashings 3 therebetween to hold rigging 4. The deadeye 2 is attached to a chain plate 5 attached to the deck or hull 6 of a boat. Stainless steel rigging and turnbuckles have also been used in the past. However, high strength and low stretch synthetic rigging has weight advantages and is often used with pairs of deadeyes 1 and 2. It is often necessary or desirable to adjust the tension or load on the rigging.

There are known strain measuring systems for monitoring the loads on standing rigging in sailboats. One such strain measuring system is disclosed in U.S. Pat. No. 6,543,296 entitled "Method of Monitoring/measuring Rigging Loads" issuing to Bermudez on Apr. 8, 2003. Therein disclosed is a turnbuckle having a strain gauge used to measure loads on the standing rigging of a sailboat.

There are other devices used in sailboats that utilize load cells to measure loads on sailboat rigging. These other devices are generally sheer pins used in standard hardware, such as shackles, for measuring loads. One manufacture of these sheer pin load cells used in sailboats is Diverse Yachts having a place of business at Port Hamble in the United Kingdom.

While these prior devices have helped to measure loads in the rigging of sailboats using turnbuckles and sheer pins, there is a need to improve the load measuring capabilities and especially when other types of rigging is used, and in particular the use of deadeyes with synthetic rigging.

SUMMARY OF THE INVENTION

The present invention is capable of accurately detecting the loads or tension in the synthetic rigging of a sailboat. A deadeye used with the synthetic rigging has an opening with a plurality of strain gauges placed in different configurations so as to accurately measure the loads in the synthetic rigging.

It is an object of the present invention to detect the loads in rigging of a sailboat utilizing synthetic rigging material and deadeyes.

It is an advantage of the present invention that loading of sailboat rigging is accurately detected.

It is a further advantage of the present invention that the tensioning of the sailboat rigging can be optimized for increasing the efficiency of the sailboat.

It is yet a further advantage of the present invention that the useful life of the rigging can be extended.

It is a feature of the present invention that a deadeye has an opening with a structure for the placement of strain gauge modules or a strain gauge.

It is another feature of the present invention that the strain gauges are contained on strain gauge modules and are easily replaced or repaired.

It is yet another feature of the present invention that a column, support arm, or substrate is used to transmit forces to the strain gauge.

These and other objects, advantages, and features will become more readily apparent in view the following more detailed description.

BRIEF DESCRIPTION OF THE DRAWINGS

FIG. 2A is an elevation view of a deadeye of a first embodiment of the invention.

FIG. 2B is an enlarged view of the portion in dashed circle 2B illustrated in FIG. 2A.

FIG. 2C is a perspective view of the first embodiment of the invention.

FIG. 4A is an elevation view of a deadeye of a third embodiment of the invention.

FIG. 4B is an enlarged view of the portion in dashed circle 4B illustrated in FIG. 4A.

FIG. 4C is a perspective view of the third embodiment of the invention.

FIG. 5A is an elevation view of a deadeye of a fourth embodiment of the invention.

FIG. 5B is a cross section taken along line 5B-5B illustrated in FIG. 5A.

FIG. 5C is a perspective view of the fourth embodiment of the invention.

FIG. 6A is an elevation view of a deadeye of a fifth embodiment of the invention.

FIG. 6B is a cross section taken along line 6B-6B illustrated in FIG. 6A.

FIG. 6C is a perspective view of the fifth embodiment of the invention.

BRIEF DESCRIPTION OF THE PREFERRED EMBODIMENTS

Figure 1:
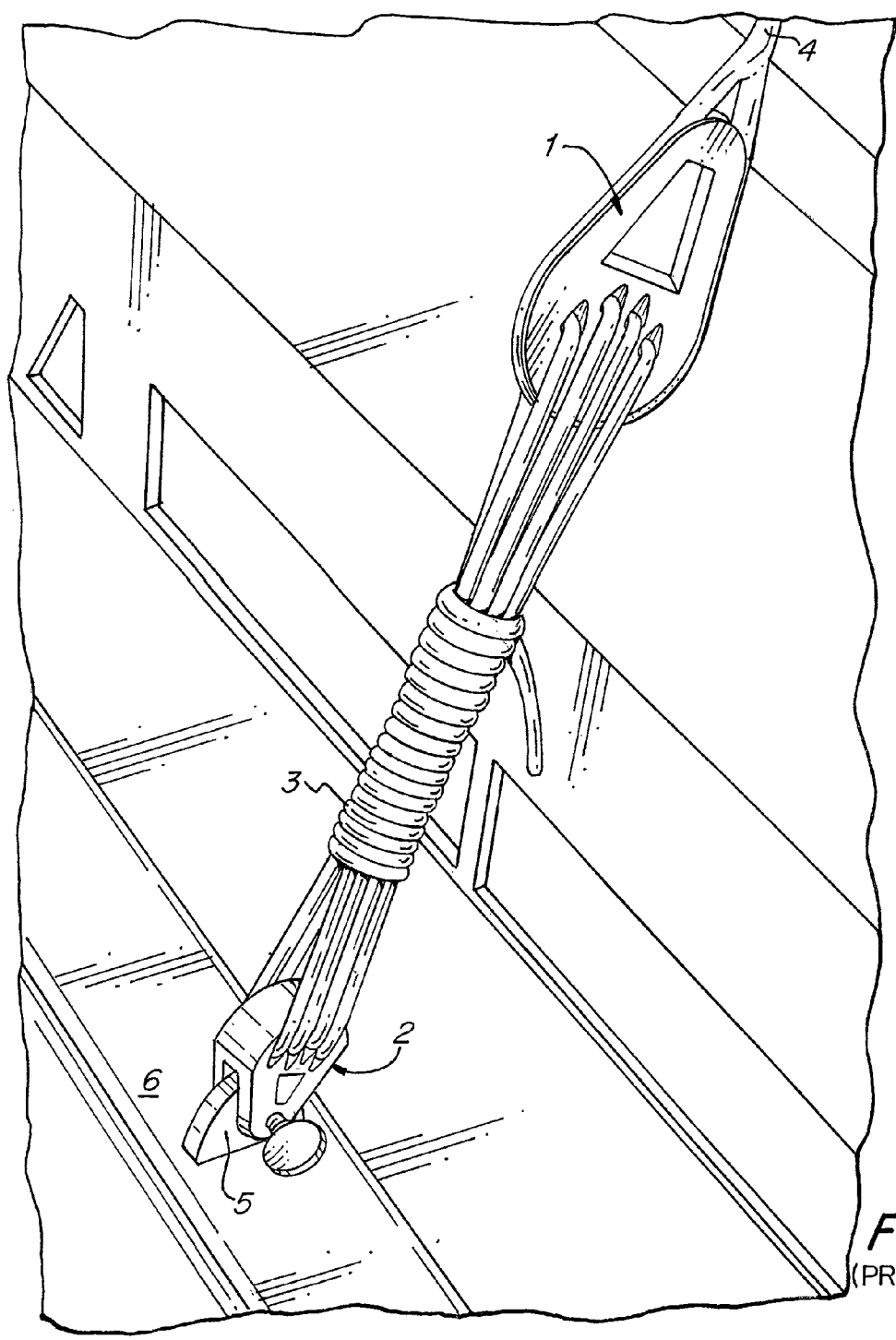
FIG. 1 illustrates a pair of deadeyes and lashings used to tension standing synthetic rigging in a sailboat.
Figure 3A:
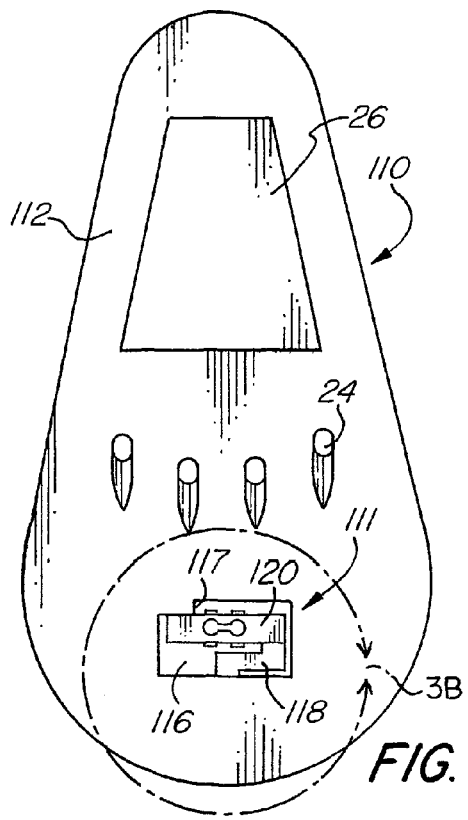
FIG. 3A is an elevation view of a deadeye of a second embodiment of the invention.
Figure 3B:
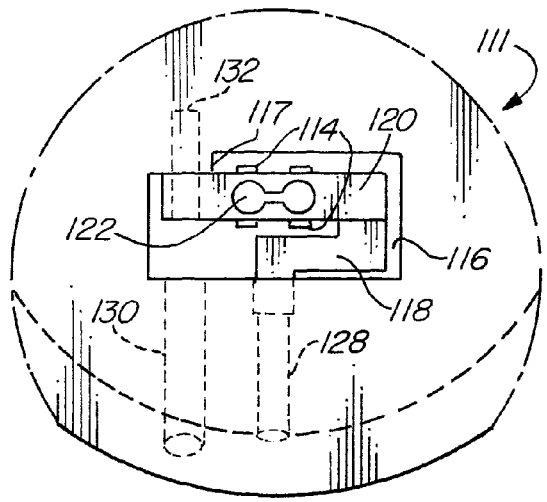
FIG. 3B is an enlarged view of the portion in dashed circle 3B illustrated in FIG. 3A.
Figure 3C:
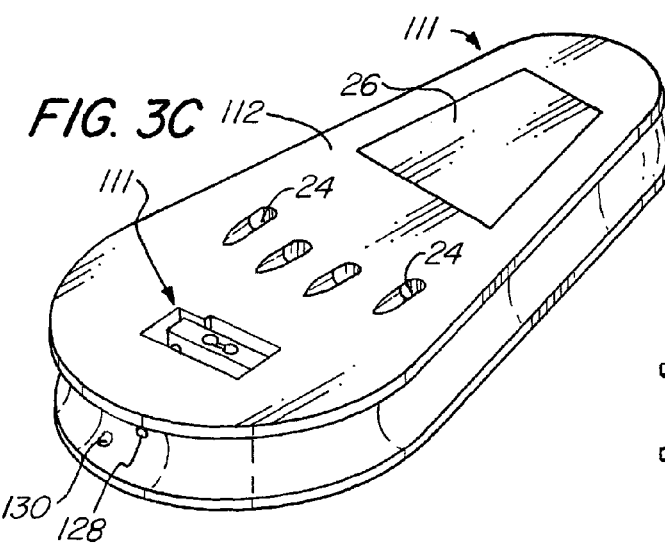
FIG. 3C is a perspective view of the second embodiment of the invention.
Figure 3D:
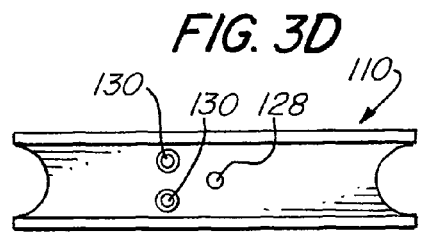
FIG. 3D is a bottom plan view of the second embodiment of the invention.

The present invention provides a deadeye used in rigging for sailboats that measures the load or tension placed on the rigging. The invention is particularly advantageous when used with synthetic rigging. FIGS. 2A-C illustrate a first embodiment of the invention. The deadeye 10 comprises a body 12 having a strain gauge module 11 contained therein. A pair of openings 16 are formed in the body 12 by a centrally positioned column 18 placed adjacent a substrate 20. Substrate 20 is formed alongside one side of the pair of openings 16 created by the centrally positioned column 18. An opposing side of the substrate 20 is adjacent a gap 22. Placed on the surface of the substrate 20 is a plurality of strain gauges 14. The strain gauges 14 are coupled to a transmitter module 26 for wirelessly transmitting data from the strain gauges to a receiver, not shown, for displaying tension or load in the rigging. The strain gauges 14 may be coupled to the transmitter module 26 by wires or other electrical conductors, not shown. The opening 16 is placed between the lashing eyelets or eyes 24 for receiving the lashings, not shown, and the end of the deadeye 10 holding the rigging and receiving the force or load from the rigging. The resulting compressive force placed on column 18 causes bending of the substrate 20 resulting in strain gauges 14 to change resistance or other electrical parameter, thereby measuring the load or tension in the rigging. The signals from the strain gauges 14 may be transmitted wirelessly by transmitter module 26, or may be transmitted by wires, not shown. The opening 16 may also be covered, preferably with a non-structural member so as not to affect the loading of the substrate 22 and the strain gauges 14 and yet protect the strain gauges 14 from damage. Holes 23 are formed adjacent the location of the strain gauges 14 on the substrate 22. The holes 23 provide a reduced and measured substrate thickness adjacent the strain gauges 14.

FIGS. 3A-D illustrate a second embodiment of the present invention having a different strain gauge module 111. The deadeye 110 comprises a body 112 having a strain gauge module 111 contained therein. An opening 116 formed in the body 112 has a substrate 120 placed therein. The substrate 120 is supported at one end by a support mount 117 of the body 112 and at another end by a support arm 118. The substrate 120 is held in place by a screw or other fastener placed in substrate mounting hole 132 and accessed through hole 130. The support arm 118 is held in position by a screw or fastener placed in set screw mounting hole 128. A plurality of strain gauges 114 are place on the surface of the substrate 120. The plurality of strain gauges 114 may be placed on opposing surfaces of the substrate 120. A gap 122 is placed in the substrate 120. Gap 122 has circular holes positioned adjacent each of the plurality of strain gauges 114. The force or load from the rigging is caused to be placed on support arm 118 and the support mount 117 or portion of the body 112 contacting the substrate 120. This causes bending of the substrate 122 resulting in strain gauges 114 changing resistance or other electrical parameter, thereby measuring the load or tension in the rigging. In this embodiment the substrate 120 and plurality of strain gauges 114 can easily be changed when needed. The plurality of strange gauges 114 can be changed for repair, or to insert different strain gauges having different parameters or ranges of load measuring capability.

FIGS. 4A-C illustrate a third embodiment of the present invention having a different strain gauge module 211. Strain gauge module 211 is an insert placed within opening 216 formed in the body 212 in the deadeye 210. The strain gauge module 211 has a plurality of holes 222 therein with webs 218 formed between the plurality of holes 222. A plurality of strain gauges or strain gauge elements 214 are placed on the webs 218 and therefore are formed or placed between and adjacent each of the plurality of holes 222. A compressive force between the lashing eyes 24 formed in the body 212 and the end of the body 212 holding the rigging causes webs 218 to deflect. This deflection in the webs 218 results in the strain gauges 214 changing resistance or other electrical parameter, thereby causing the load or tension in the rigging to be detected or measured.

FIGS. 5A-C illustrate a fourth embodiment of the present invention. In this embodiment deadeye 310 has a circular or round opening or hole 322 placed in the body 312 between the lashing eyes 24 and an end of the body 312 receiving and holding the rigging. Within the inner circumference of the hole 322 is placed a plurality of strain gauges 314. The strain gauges 314 are preferably spaced approximately ninety degrees apart along the inner surface of the hole 322. As the circumference of the hole 322 changes, the resistance or other electrical parameter of the strain gauges 314 changes and the load or tension on the rigging determined.

FIGS. 6A-C illustrate a fifth embodiment of the present invention. In this embodiment deadeye 410 has a rectangular opening or hole 422 placed in the body 412 between the lashing eyes 24 and an end of the body 412 receiving and holding the rigging. On the inner upper surface of the rectangular hole 422 is placed a plurality of strain gauges 414. The strain gauges 414 detect bending of the inner upper surface of the rectangular hole 422. This bending is converted into an electrical parameter, such as resistance, current, or voltage, by the strain gauges 414 so as to detect and measure the load or tension on the rigging.

Figure 7A:
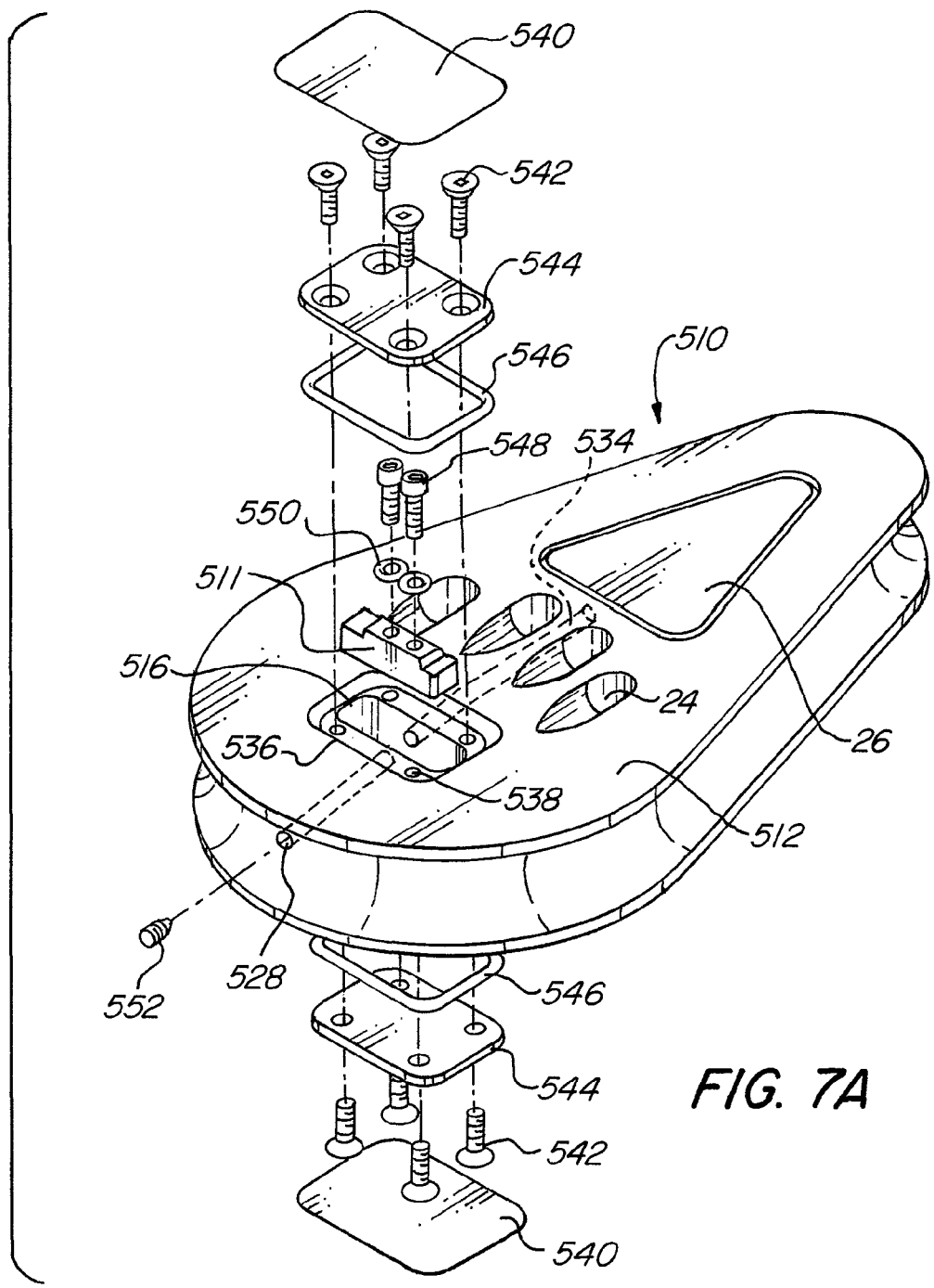
FIG. 7A is a perspective view of a sixth embodiment of the invention.
Figure 7B:
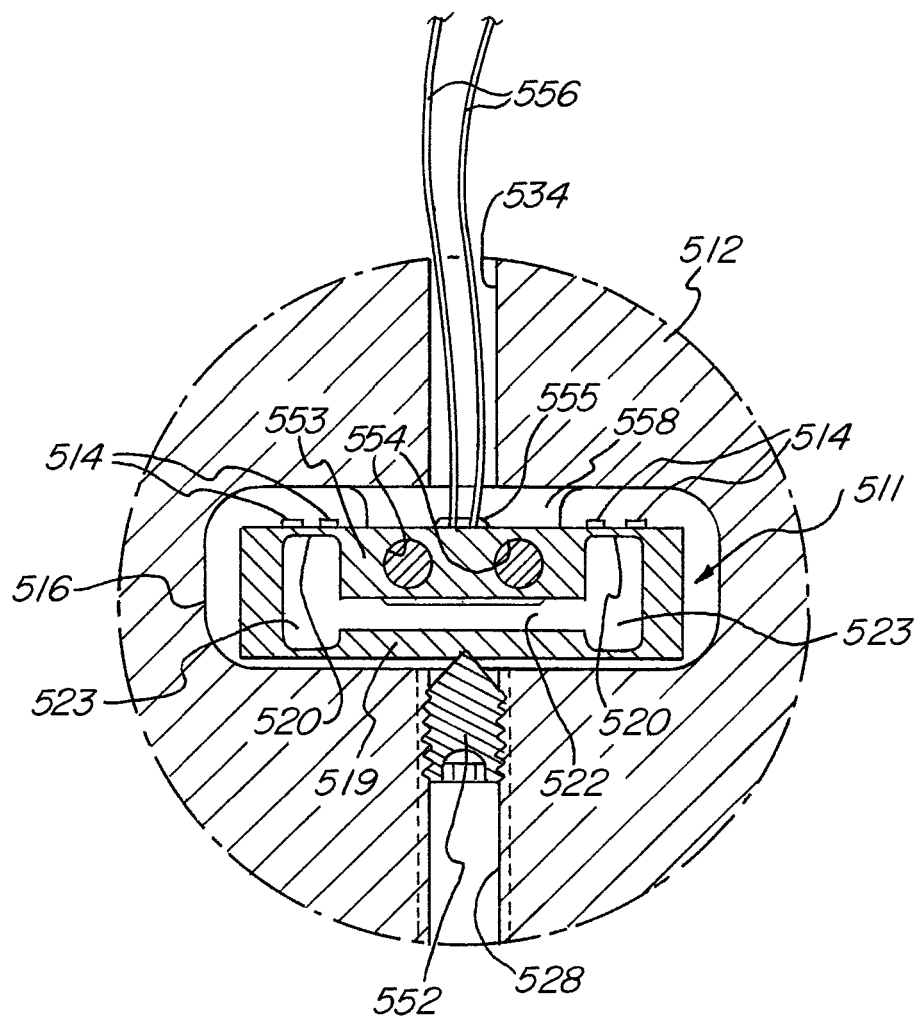
FIG. 7B is a schematic illustration of an enlarged portion of a section of the sixth embodiment of the invention.

FIGS. 7A-B illustrate a sixth embodiment of the present invention. In this embodiment deadeye 510 has an opening 516 for receiving a strain gauge module 511. The body 512 of the deadeye 510 has a load screw mounting hole 528 and wire bore 534 extending therethrough. The wire bore 534 extends between two of the eyes 24. Placed within the deadeye 510 is a transmitter module 26. The strain gauge module 511 is held in position within the opening 516 by sensor mounting screws 548. Once the strain gauge module 511 is secured within the opening 516 it is sealed within the opening. A seal 546 and cover 544 are placed within the cover recess 536 and secured by screws 542 threaded into the screw holes 538. Cover 548 placed over the screws 542 and cover 544.

FIG. 7B schematically illustrates in greater detail a portion of deadeye body 512 and the strain gauge module 511. The strain gauge module 511 is placed within the opening 516 and is held in position with sensor mounting screws or fasteners 548 extending through a sensor mounting structure 553 having screw holes 554 and into an attaching member 558 extending from a portion of the body 512 within the opening 516. The strain gauge module 511 has holes 523 therein connected by gap 522 forming a load member 519. A load screw 552 is threaded into the load screw mounting bore 528 so that a preloaded may be placed on the load member 519 of the strain gauge module 511. Strain gauges 514 are placed on the substrate 520 adjacent one end portion of the holes 523. Strain gauges 414 are electrically connected to the wires 556 by bonding pad 555. The wires 556 extend through the wire bore 534 and connect to the transmitter module 26, illustrated in FIG. 7A.

The embodiment illustrated in FIGS. 7A-B has the advantage that the strain gauge module 511 is replaceable and can easily be repaired or replaced with a different strain gauge module. Additionally, the strain gauge module has the capacity to be preloaded by the load screw 552 so that it may be, calibrated or adjusted depending upon the circumstances or conditions.

The transmitter module 26, illustrated schematically in the figures may be any wireless transmitting system used with strain gauges to transmit signals wirelessly. The signals may be received at another location for analysis and display of the loads or tension placed on the standing rigging of the sailboat. Adjustments can then be made to increase performance or extend the life of the standing rigging. A wireless transmitting system that could be used for the transmitter module 26 is disclosed in U.S. Pat. No. 7,975,554 issuing to Berkcan et al.

on Jul. 12, 2011 and entitled "Wireless Strain Sensor, Detection Methods, and Systems", which is herein incorporated by reference.

The present invention by forming an opening in the body of the deadeye between the lashing eyes and the end of the deadeye holding the rigging results in compressive forces created by tension in the rigging that are capable of being detected and measured with a strain gauge module placed within the opening. The tension or load in the rigging can be detected or measured without any modification to the sailboat or rigging other than replacing an old deadeye with the deadeye of the present invention.

While the present invention has been described with respect to several different embodiments, it will be obvious that various modifications may be made without departing from the spirit and scope of this invention.

What is claimed is:

1. A device for measuring load or tension in rigging of a sailboat comprising:
    a deadeye having an end adapted to hold the rigging of a sailboat;
    lashing eyes formed in said deadeye adapted to hold lashings;
    an opening formed in said deadeye between the end of said deadeye and said lashing eyes, whereby a compressive force is placed on said opening between the end of said deadeye and said lashing eyes by the rigging; and
    a strain gauge placed within said opening and positioned to measure the compressive force placed on said opening, whereby the load or tension in the rigging can be measured.

2. A device for measuring load or tension in rigging as in claim 1 further comprising:
    a hole adjacent said opening forming a substrate, wherein said strain gauge is formed on said substrate.

3. A device for measuring load or tension in rigging as in claim 2 further comprising:
    a column extending across said opening and having one end adjacent the substrate.

4. A device for measuring load or tension in rigging as in claim 1 wherein:
    said strain gauge is formed on a strain gauge module.

5. A device for measuring load or tension in rigging as in claim 1 further comprising:
    a support arm placed within said opening;
    a support mount formed within said opening;
    a substrate placed within said opening and extending between said support arm and said support mount; and
    wherein said strain gauge is formed on said substrate.

6. A device for measuring load or tension in rigging as in claim 4 wherein:
    said strain gauge module comprises,
    a substrate having a plurality of holes formed therein;
    webs separating the plurality of holes; and
    wherein said strain gauge comprises a plurality of strain gauge elements placed in said webs between and adjacent each of said plurality of holes.

7. A device for measuring load or tension in rigging as in claim 6 wherein:
    said substrate has a circular shape.

8. A device for measuring load or tension in rigging as in claim 1 wherein:
    said strain gauge is formed on a surface of said deadeye adjacent said opening.

9. A device for measuring load or tension in rigging as in claim 8 wherein:
    said opening is round.

10. A device for measuring load or tension in rigging as in claim 8 wherein:
    said opening is rectangular.

11. A device for measuring load or tension in rigging as in claim 1 further comprising:
    a transmitter module coupled to said strain gauge.

12. A device for measuring load or tension in rigging of a sailboat comprising:
    a deadeye body having an end adapted to hold the rigging of a sailboat;
    lashing eyes formed in said deadeye body adapted to hold lashings;
    an opening formed in said deadeye body between the end of said deadeye and said lashing eyes, whereby a compressive force is placed on said opening between the end of said deadeye and said lashing eyes by the rigging;
    an attaching member formed in said opening;
    a strain gauge module attached to said attaching member and positioned to measure the compressive force placed on said opening;
    a transmitter module coupled to said strain gauge module, whereby tension in the rigging of the sail boat is determined.

13. A device for measuring load or tension in rigging of a sailboat as in claim 12 further comprising:
    a load screw contacting said strain gauge module, whereby a portion of said strain gauge module may be pre-loaded.

14. A device for measuring load or tension in rigging of a sailboat as in claim 12 wherein:
    said strain gauge module comprises:
    a substrate supported on either end within said opening formed in said deadeye body;
    a gap formed in said substrate; and
    a plurality of strain gauges formed on the surface of said substrate adjacent said gap.

15. A device for measuring load or tension in rigging of a sailboat as in claim 12 wherein:
    said strain gauge module comprises:
    a circular substrate having a plurality of holes formed therein; and
    a plurality of strain gauges placed between and adjacent each of said plurality of holes.

16. A device for measuring load or tension in rigging of a sailboat as in claim 12 wherein:
    said strain gauge module comprises:
    a pair of holes connected by a gap;
    a pair of substrates, one of said pair of substrates formed adjacent each one of said pair of holes;
    a strain gauge mounted on each one of said pair of substrates;
    a load member formed on one side of the gap; and
    a sensor mounting structure formed on an opposing side of said gap.

17. A device for measuring load or tension in rigging of a sailboat as in claim 12 further comprising:
    a cover placed over said hole,
    whereby said strain gauge module is sealed within said deadeye body.

18. A device for measuring load or tension in synthetic standing rigging of a sailboat comprising:
    a deadeye body;
    lashing eyes formed in said deadeye body;
    an opening formed in said deadeye body between an end thereof and said lashing eyes;
    an attaching member formed in said opening;
    a strain gauge module attached to said attaching member, said strain gauge module comprising;

a pair of holes connected by a gap;
a pair of substrates, one of said pair of substrates formed adjacent each one of said pair of holes;
a strain gauge mounted on each one of said pair of substrates;
a load member formed on one side of the gap;
a sensor mounting structure formed on an opposing side of said gap;
fasteners attaching said sensor mounting structure to said attaching member formed in said opening;
a load screw contacting said load member, whereby said strain gauge module may be pre-loaded; and
a transmitter module coupled to said strain gauge module, whereby tension in the rigging of the sailboat is determined and representative signals indicating the tension are transmitted by said transmitter module.

* * * * *